(12) United States Patent
    Chi

(10) Patent No.: US 12,548,468 B2
(45) Date of Patent: Feb. 10, 2026

(54) COMPREHENSIVE TEACHING AID SYSTEM FOR GENETIC SCIENCE

(71) Applicant: Maoyen Chi, New York, NY (US)

(72) Inventor: Maoyen Chi, New York, NY (US)

( * ) Notice: Subject to any disclaimer, the term of this patent is extended or adjusted under 35 U.S.C. 154(b) by 860 days.

(21) Appl. No.: 17/745,706

(22) Filed: May 16, 2022

(65) Prior Publication Data

US 2022/0277666 A1    Sep. 1, 2022

Related U.S. Application Data

(63) Continuation-in-part of application No. PCT/CN2020/132428, filed on Nov. 27, 2020.

(30) Foreign Application Priority Data

Nov. 29, 2019    (CN) .......................... 201911199003.1

(51) Int. Cl.
    *G09B 23/26* (2006.01)
(52) U.S. Cl.
    CPC .................................... *G09B 23/26* (2013.01)
(58) Field of Classification Search
    CPC ....................................................... G09B 23/26
    See application file for complete search history.

(56) References Cited

U.S. PATENT DOCUMENTS 3,594,924 A * 7/1971 Baker ..................... G09B 23/26
                                                    434/279
4,184,271 A * 1/1980 Barnett, Jr. ............ G09B 23/26
                                                    446/120
2012/0196259 A1* 8/2012 Woodward ............. G09B 23/26
                                                    434/279

(Continued)

FOREIGN PATENT DOCUMENTS

| CN | 201196848 Y | 2/2009 |
| CN | 201681512 U | * 12/2010 |
| CN | 207425191 U | 5/2018 |

(Continued)

OTHER PUBLICATIONS

CN201681512U (Translation) (Year: 2016).*

(Continued)

*Primary Examiner* — Peter S Vasat
*Assistant Examiner* — Selwa A Alsomairy

(57) ABSTRACT

A comprehensive teaching aid system for genetic science at least including numerous (deoxy-) ribonucleotide models that can be assembled to form DNA/RNA single strands, or to form the beautiful DNA double helix structure when numerous adjacently and oppositely connected deoxynucleotide models are attached by magnets, tRNAs, and three different plates for DNA replication, mRNA transcription and protein synthesis respectively. The (deoxy-) nucleotide model includes a phosphate model, a (deoxy-) ribose model and a base model connected in sequence. Between two adjacently disposed (deoxy-) ribonucleotide models, a (deoxy-) ribose model is connected to a phosphate model in the head-to-tail fashion to form a detachable and flexible chain structure. The base model is laterally connected to the (deoxy-) ribose model, and two base models in two oppositely disposed deoxynucleotide models are flexibly and complementarily attached.

20 Claims, 12 Drawing Sheets

(56) References Cited

U.S. PATENT DOCUMENTS

2016/0133157 A1\* 5/2016 Casarez ................ G09B 23/26
434/279

FOREIGN PATENT DOCUMENTS

| CN | 110910736 A | 3/2020 |
| CN | 211349858 U | 8/2020 |

OTHER PUBLICATIONS

3D Molecule Designs (Year: 2016).\*
NIH: Mutation (Year: 2019).\*
International search report of PCT/CN2020/132428.

\* cited by examiner

COMPREHENSIVE TEACHING AID SYSTEM FOR GENETIC SCIENCE

TECHNICAL FIELD

The present invention relates to the field of genetic science, in particular to a comprehensive teaching aid system for genetic science.

BACKGROUND

The central dogma of biology (referred to as the central dogma): deoxyribonucleic acids (DNAs) are the storage medium of all life's genetic information. The central dogma reveals that genetic information flows from a DNA to a ribonucleic acid (RNA), and then to a protein so that the protein performs the essential functions of various life-sustaining activities in cells. The discovery of the central dogma unifies the understandings of all living things in the nature from the simplest form of life, i.e., viruses to human beings. This finding is one of the most important scientific discoveries of the 20th century. The central dogma is not only a theoretical foundation of molecular biology, but also the cornerstone of biotechnology as well as biotech industry. Therefore, the teaching and learning of the central dogma is crucial to all fields of biology, medicine, as well as big data and all of health industry. Contemporary life science, such as, DNA sequencing, gene transcription, translation, regulation of gene expression and mechanisms of gene mutations, protein folding, bioinformatics, as well as all other health or bio-related industries all are central dogma based.

However, the understanding of central dogma requires a whole range of specific concepts from chemistry, physics, biology to information science, the understanding and mastery of this fundamental principle also requires a broad and solid academic training. In addition, all concepts and phenomena involved in central dogma occur at the molecular level, which is microscopic and highly abstract in nature, beyond the scope of our daily life, furthers the difficulty of teaching and learning of the subject. Because of these hurdles and barriers it has been formidable for non-professionals to easily grasp its essence and essentials. In addition, the significance and importance of general education of sciences is recognized and appreciated globally, particularly in the post-pandemic world. As mentioned above, life science is the most active forefront of today's human scientific endeavor for understanding of our world, and the biomedical industry is also one of the pillars of economy related to the important issues such as the life quality, human wellbeing, social stability, and societal prosperity, etc. And the genetic science centered around the central dogma is the very core or foundation of life science and biomedical industry.

Therefore, it is absolutely necessary to provide a set of comprehensive genetic science teaching tools, which is accurate, intuitive, inspiring and easily applicable not only to junior students or non-professionals, but also to professionals and basically for every body from all walks of life, to allow them to quickly appreciate the principle of central dogma by crossing the educational or professional training gaps.

SUMMARY

To provide such required teaching and learning tool, the present invention provides a systematic teaching aid system for genetic science, which can dynamically assemble and display the DNA double helix structure, reflects the underline the principle of central dogma, of which genetic information flows from DNA to RNA and then to protein. The tool provides an easy and intuitive way for its users to appreciate the very key principle of all lives.

The technical solutions provided in the present invention are:

a comprehensive teaching aid system for genetic science at least including a DNA double helix model composed of several adjacently and oppositely connected deoxynucleotide models, the deoxynucleotide model including a phosphate model, a deoxyribose model and a base model connected in sequence, wherein between the two adjacently disposed deoxynucleotide models, the deoxyribose model is freely connected to the phosphate model to form a detachable and flexible chain structure;

the base model is laterally connected to the deoxyribose model, and the two base models in the two oppositely disposed deoxyribose models are complementarily connected yet detachable; and the DNA double helix structure can be freely rotated along the axial direction.

In some preferable embodiments, in a single (deoxy-) nucleotide model, the (deoxy-) ribose model is integrated with the phosphate model, and a spherical connection body is disposed at the end of the (deoxy-) ribose model away from the phosphate model; a spherical receiving cavity that is axially-opened is disposed in the phosphate model, and the spherical receiving cavity is adaptively connected to the spherical connection body in another (deoxy-) nucleotide model which is adjacently disposed.

In some preferable embodiments, the phosphate model further includes at least one buffer slot disposed on a side thereof, and the opening direction of the buffer slot is consistent with the opening direction of the spherical receiving cavity.

In some preferable embodiments, the (deoxy-) ribose model further includes a clamping slot disposed on a side thereof, and the base model includes a clamping section disposed at an end of the base model and adaptively connected to the clamping slot.

In some preferable embodiments, the base model represents one of adenine (A), thymine (T), guanine (G), uracil (U) or cytosine (C), the base models representing different bases are structurally different from each other at one of the ends, and the ends of the two complementarily connected base models are dynamically attached to each other via special magnetic mechanism.

In some preferable embodiments, the base model includes a connection end with a structure including one of circular arc-shaped convex, circular arc-shaped concave adaptively connected to the circular arc-shaped convex, triangular structure, and inverted-triangular-concave adaptively connected to the convex structure.

In some preferable embodiments, the base models representing different bases have different colors.

In some preferable embodiments, there is a magnetic connection or a mechanical connection between the two adaptively connected base models.

In some preferable embodiments, the teaching aid system further includes a mutant base model, and the mutant base model is not complementarily connected to any of the oppositely disposed base model.

In some preferable embodiments, the teaching aid system further includes a DNA replication plate at least includes a first groove and a second groove which are respectively adapted with the two chain structures of the DNA double helix model, at least part of the relative distance between the first groove and the second groove varies gradually, and the minimum relative distance between the first groove and the second groove is equal to the relative distance between the two oppositely disposed deoxyribose models in the DNA double helix model; when the relative distance between the first groove and the second groove is greater than the relative distance between the two oppositely disposed deoxyribose models, the complementarily connected base models are separated to form two DNA single strands.

In some preferable embodiments, the DNA replication plate further includes a third groove and a fourth groove disposed between the first groove and the second groove, the first groove and the third groove, as well as the second groove and the fourth groove are respectively disposed in parallel, the relative distance between the two grooves parallel to each other is equal to the relative distance between the two oppositely disposed deoxyribose models, and several free deoxynucleotide models paired with the DNA single strand in the first groove or the second groove are disposed in the third groove or the fourth groove, respectively; when the deoxynucleotide model movably disposed in the third groove and the DNA single strand disposed in the first groove, as well as the deoxynucleotide model movably disposed in the fourth groove and the DNA single strand disposed in the second groove are adaptively connected, respectively, to form a new DNA double helix model, the replication of the DNA is completed.

In some preferable embodiments, the teaching aid system further includes an RNA transcription plate, the first base or the second base is further used to represent uracil (U), and the RNA transcription plate includes a planar main plate and an independent catheter, a fifth groove and a sixth groove oppositely disposed on the planar main plate and respectively adapted with two chain structures of the DNA double helix model, the relative distance between the fifth groove and the sixth groove is greater than the relative distance between the two oppositely disposed deoxyribose models so that the first base model and the second base model are separated to form two DNA single strands, facilitating the pairing between the free ribonucleotide model and the DNA single strand in the sixth groove to form a messenger RNA model.

In some preferable embodiments, the teaching aid system further includes a translation plate and a transfer RNA model, the translation plate at least includes an eighth groove adapted with the messenger RNA model, the transfer RNA model includes an amino acid molecule connecting structure disposed at one end thereof and a codon reading structure disposed at the other end thereof, and the transfer RNA model is subject to base pairing with the messenger RNA model through the codon reading structure to bring two amino acid molecules adjacent so that a rigid peptide bond can be formed between them.

In some preferable embodiments, the teaching aid system further includes a gene expression regulation mechanism identifier and an epigenetic gene regulation identifier, the gene expression regulation mechanism identifier is connected to the deoxyribose model and the epigenetic gene regulation identifier is connected to the base model.

The educational effects of the technical solution provided in the embodiments of the present invention are as follows.

The present invention provides a comprehensive teaching aid system for genetic science at least including a DNA double helix model composed of several adjacently and oppositely connected deoxynucleotide models, the deoxynucleotide model includes a phosphate model, a deoxyribose model and a base model connected in sequence, and the DNA double helix structure can be freely rotated along the axial direction; the comprehensive teaching aid system is based on a detachably connected deoxynucleotide model, which can be freely assembled to form DNA double helix structure, and the DNA double helix structure can be freely rotated along the axial direction to display the left-handed structure of the DNA double helix from different angles; the teaching aid system at least includes an RNA single strand model composed of several adjacently connected ribonucleotide models, and the ribonucleotide model includes a phosphate model, a ribose model, and a base model which are flexibly and detachably connected in sequence; the comprehensive teaching aid system is based on detachably connected ribonucleotide models, which can be freely assembled to form an RNA single stranded structure and various corresponding RNA secondary structures, and can be used for biological learning or intuitive understanding.

Moreover, the deoxynucleotide models include base models representing adenine (A), thymine (T), guanine (G) or cytosine (C), the ribonucleotide models include bases which are different from and paired with the bases in the base model uracil (U), and the complementary connection structures between different paired bases are different to reflect the base-pairing rules.

Moreover, the teaching aid system further includes a DNA replication plate, an RNA transcription plate, a translation plate, and a transfer RNA model, which dynamically simulates the process that genetic information flows from DNA to RNA and then to protein within the carved grooves of these plates, which allows the free movement of DNA/RNA single strand models in a railroad-fashion.

BRIEF DESCRIPTION OF DRAWINGS

To illustrate more clearly technical schemes in embodiments of the present invention or the related art, the accompanying drawings used in description of the embodiments will be briefly described below, and obviously, the accompanying drawings in the following description show only some embodiments of the present invention, and for those of ordinary skill in the art, other drawings can be derived on the basis of these drawings without any inventive effort.

DETAILED DESCRIPTION

Figure 1:
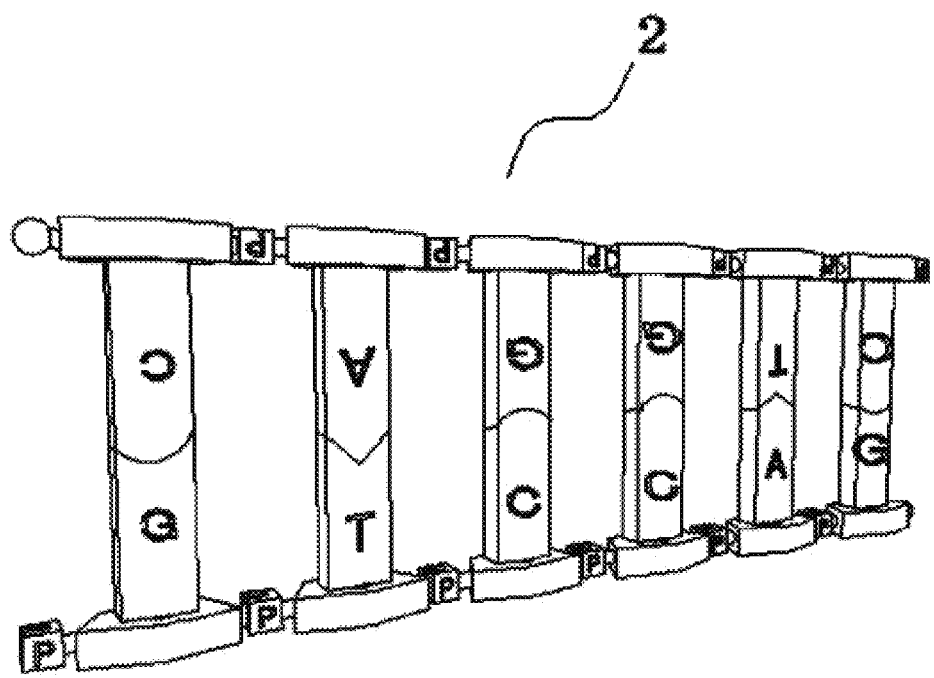
FIG. 1 is a schematic structural view of a DNA double-strand model provided in an embodiment of the present invention.

To make the objectives, technical schemes and advantages of the present invention clearer, the technical schemes in the embodiments of the present invention are clearly and completely described in the following with reference to the accompanying drawings in the embodiments of the present invention. It is obvious that the described embodiments are only some of the embodiments instead of all the embodiments of the present invention. All other embodiments obtained by those of ordinary skill in the art based on the embodiments of the present invention without inventive effort are within the scope of the present invention.

In the description of the present invention, it should be understood that, descriptions relating to orientation, for example, orientation or positional relationships indicated by terms such as "X-axis", "Y-axis", "Z-axis", "perpendicular", "parallel", "up", "down", "front", "back", "left", "right", "vertical", "horizontal", "top", "bottom", "inside", and "outside", are based on the orientation or positional relationships shown in the accompanying drawings, and are to facilitate the description of the present invention and simplify the description only, rather than indicating or implying that the device or element referred to must have a specific orientation or be constructed and operated in a specific orientation, and therefore cannot be construed as limiting the present invention. In addition, the terms "first" and "second" are for the purpose of description only and should not be construed as indicating or implying relative importance or implicitly indicating the number of technical features indicated. Thus, features defined with "first" and "second" may include one or more of the features either explicitly or implicitly. In the description of the present invention, the term "plurality" means two or more, unless otherwise specified.

It should be noted that, in the description of the present invention, the terms "mount", "engage", and "connect" should be interpreted in a broad sense unless explicitly defined and limited otherwise, which, for example, can mean a fixed connection, a detachable connection or an integral connection; can mean a mechanical connection or an electrical connection; and can mean a direct connection, an indirect connection by means of an intermediary, or internal communication between two elements. For those of ordinary skill in the art, the specific meaning of the terms mentioned above in the present invention should be construed to specific circumstances.

Hereinafter, a comprehensive teaching aid system for genetic science of the present application is described in details by reference to FIGS. 1 to 12.

EXAMPLES

As shown in FIGS. 1-12, the example provides a comprehensive teaching aid system for genetic science at least including a DNA double-strand model 2 composed of several adjacently and oppositely connected deoxyribonucleotide models 1, a DNA replication plate 3, an RNA transcription plate 4, a translation plate 5, and a transfer RNA model 6, wherein the DNA double-strand model 2 can be freely rotated along the axial direction to simulate the left-handed structure of the DNA double helix when twisted, while the DNA double strand model 2 respectively adapted with the DNA replication plate 3, and its products are subsequently adapted with the RNA transcription plate, and then the translation plate with the help of transfer RNA model, ensemble dynamically simulate the replication of DNA, transcription of mRNA, translation of mRNA to synthesize protein.

Figure 2:
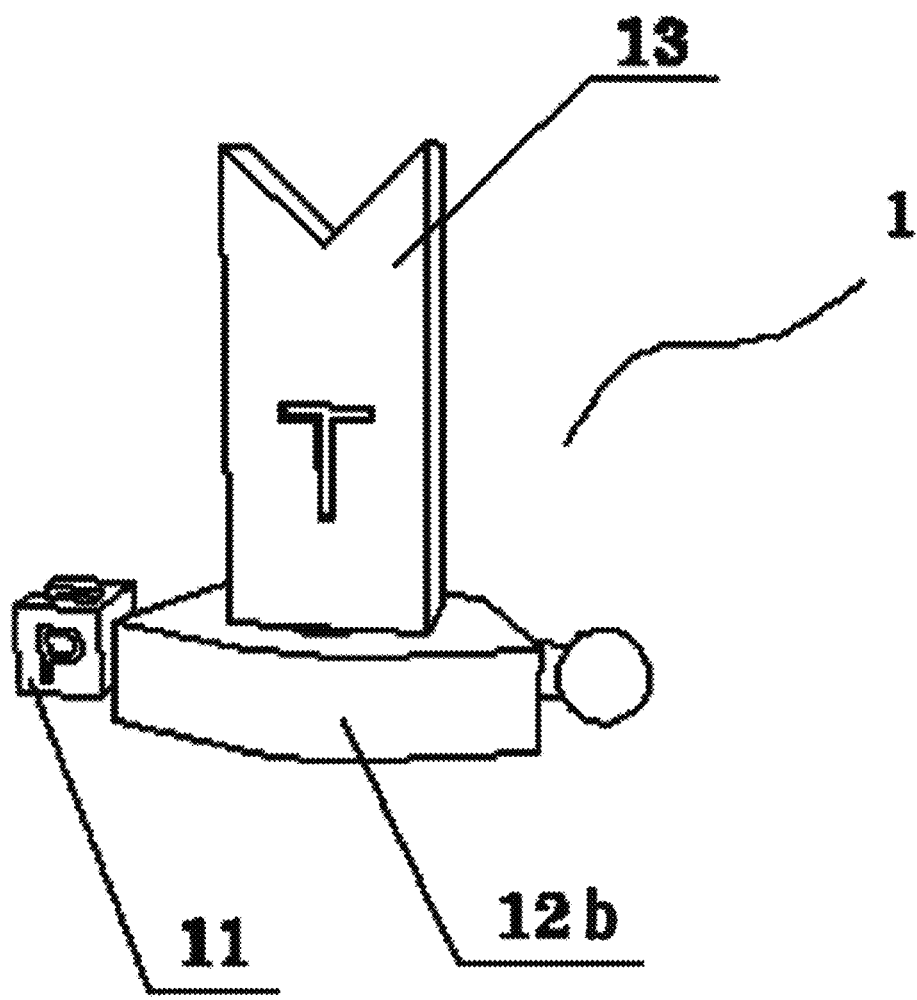
FIG. 2 is a schematic structural view of a deoxynucleotide model provided in an embodiment of the present invention.
Figure 3:
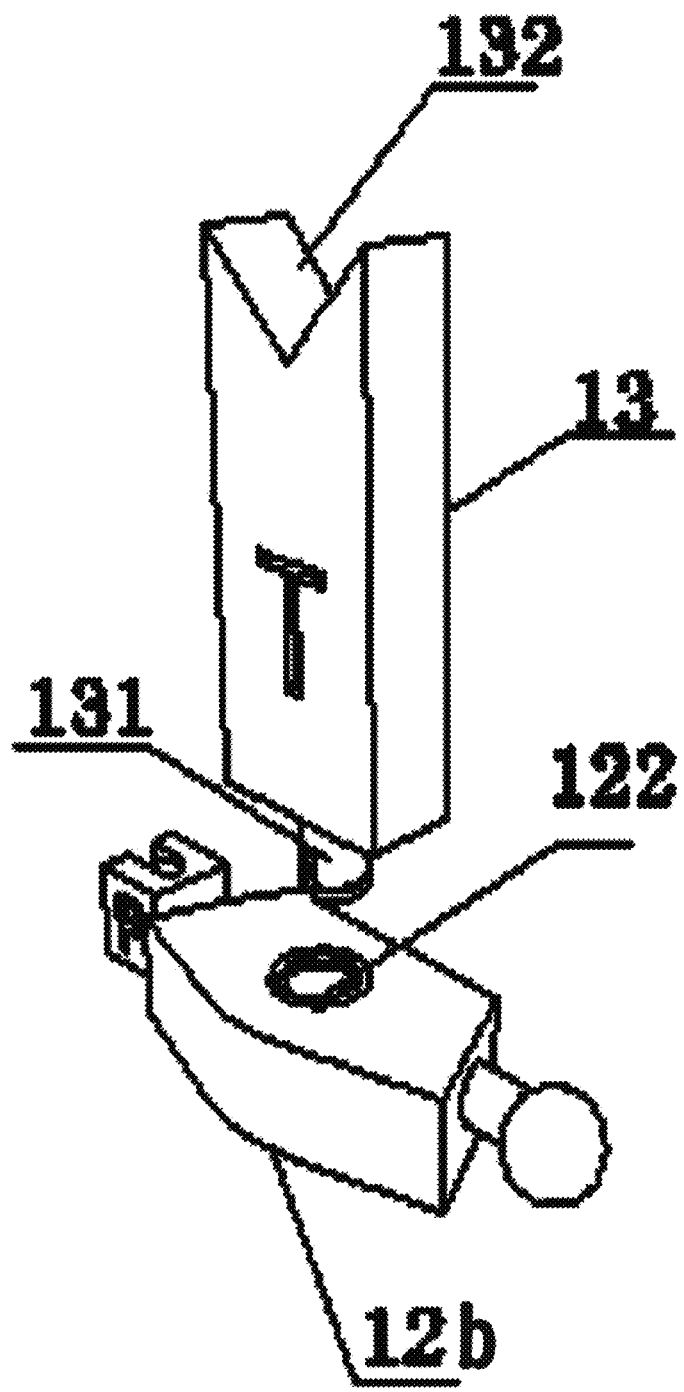
FIG. 3 is a schematic assembly view of a deoxynucleotide model provided in the embodiment of the present invention.

In particular, as shown in FIGS. 1 to 3, the single deoxynucleotide model 1 includes a phosphate model 11, a deoxyribose model 12b, and a base model 13 that are connected in sequence.

To mimic as accurately as possible the microstructure of the teaching aid, the shape of the ribose-phosphate model is designed in reference to the chemical formula of ribose. For example, the phosphate model 11 has a rectangular structure, and the surface of the model is marked with the letter "P" to indicate the phosphoric acid group. The deoxyribose model 12b is a fan-shaped structure with a planar bottom surface, and the surface of the model is marked with "H", indicating a deoxy group. In addition, the ribonucleotide model 12 for constituting the ribonucleic acid (RNA) involved in the example is the same as the deoxyribose model 12b in structure, except that the model surface is marked with "OH" to distinguish it from the deoxyribose model 12b, which is marked with an "H". As a preferable embodiment, the deoxyribose model 12b and the ribose model 12 have different colors to further distinguish the two ribose's.

Between the two adjacently disposed deoxynucleotide models 1, the deoxyribose model 12b is flexibly connected to the phosphate model 11, which enables it to form a detachable and flexible chain structure.

Figure 4:
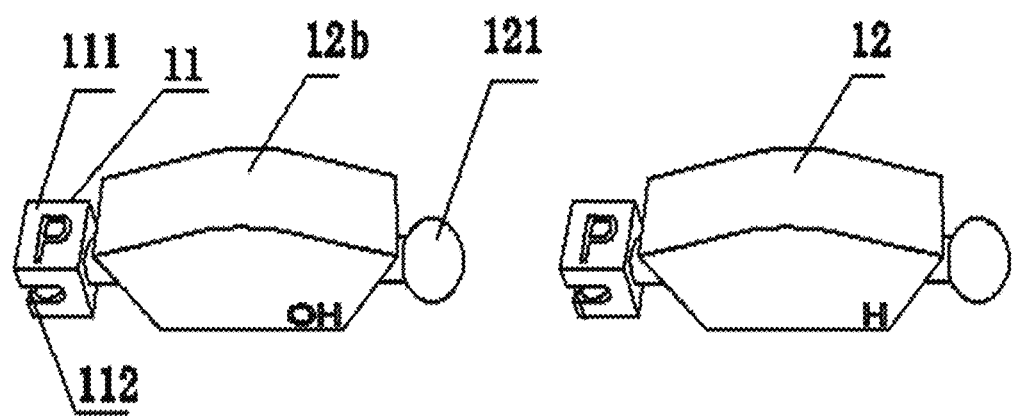
FIG. 4 is a schematic structural view of phosphate models and a deoxyribose and a ribose models provided in the embodiment of the present invention.

As shown in FIG. 4, in a single deoxynucleotide model, the deoxyribose model and the phosphate model can be disposed in separate or integrated mode. To simplify the structure and to ease the later production, an integrated mode is used in the example. The specific structure is: A spherical connection section 121 is disposed at the end of the deoxyribose model 12b away from the phosphate model 11, a spherical receiving cavity that is axially-opened 111 is disposed in the phosphate model 11, and the spherical receiving cavity 111 is adaptively connected to the spherical connection section 121 in another deoxynucleotide model 1 which is adjacently disposed. The above description also applies to a ribonucleotide model (RNA) also shown in FIG. 4.

The phosphate model 11 further includes at least one buffer slot 112 disposed on a side thereof, and the opening direction of the buffer slot 112 is consistent with the opening direction of the spherical receiving cavity 11, i.e., along the extension direction of the DNA single strand. The buffer slot 112 operates where the spherical connection section 121 is clamped into the spherical receiving cavity 111, a slight elastic deformation occurs in the spherical receiving cavity 111 and the opening is enlarged to facilitate the spherical connection section 121 to enter the spherical receiving cavity 111, and then the deformation recovers; and it is also applicable where the spherical connection section 121 is removed. As a preferable embodiment, the buffer slot 112 in the example includes two buffer slots oppositely disposed on two sides of the phosphate model 11, respectively, which further provides an operability for the model.

In addition, continuing to referring to FIG. 3, the base model 13 is laterally connected to the deoxyribose model 12b, and the two base models 13 in the two oppositely disposed deoxyribose models 1 could complementarily attached to each other. The deoxyribose model 12b further includes a clamping slot 122 disposed on the symmetry axis of the side thereof, and the base model 13 includes a clamping connection section 131 disposed at one end thereof and adaptively connected to the clamping slot 122.

The base model 13 represents one of adenine (A), thymine (T), guanine (G), uracil (U), or cytosine (C); the base models 13 representing different bases have different ending structures; and the ends of the two complementarily connected base models 13 are attached to each other. In DNAs, the specific arrangement of bases ATGC constitutes specific DNA sequences, also known as DNA codes; DNA double strand is formed by specific base pairing between A-T and G-C via hydrogen bonding, respectively, while the spacing thereof is the same upon pairing.

To distinguish between the base models, each base model 13 representing different bases have different colors, e.g., Adenine (A) is red, thymine (T) is green, guanine (G) is yellow, cytosine (C) is purple, uracil (U) is orange, and each base model 13 is marked with the corresponding letters A, T, G, C, or U on the surface to further indicate its identity.

To simplify the overall structure of the model each base is designed in a simple strip structure for the base model 13. However, the hydrogen bonding between different bases could be either double or triple bond depends whether it is an A-T or a G-C pairing. To highlight this difference, in the example, as shown in FIGS. 1 and 3, the base model 13 includes a connection end 132; and in the complementarily connected base models 13, if one of the connection ends 132 is a circular arc-shaped convex, its counter part is a circular arc-shaped concave perfectly paired therewith; and if one connection end 132 has a triangular structure, the other is an inverted triangular concave, which allows the pair to complementarily attached perfectly therewith.

For example, in the example, the adenine (A) has a triangular structure, and the thymine (T) or uracil (U) precisely connected therewith has an inverted triangular-shaped concave structure; and the cytosine (C) has a circular arc-shaped convex structure, the corresponding guanine (G) takes a circular arc-shaped concave structure.

This teaching aid system achieves an easy-to-assemble-and-disassemble connections between two complementary base models 13 via the specific concave-convex ending structure 132, in the example, there is magnetic connection or mechanical connection between the two complementarily connected ends 132.

As a preference, a magnetic connection mechanism is used in the example, i.e., at least pair of geometrically matching magnets are respectively embedded into the ends of the two complementary base 132. Therefore the two bases could be attached dynamically with the magnetic attraction exits between the two base models 132, a perfect solution for mimicking the hydrogen bonding between all base pairings.

In the mechanical connection mode, the movable connection is primarily achieved by setting the clamping connection section to fit with the bayonet, which is not further described in the example.

Figure 5:
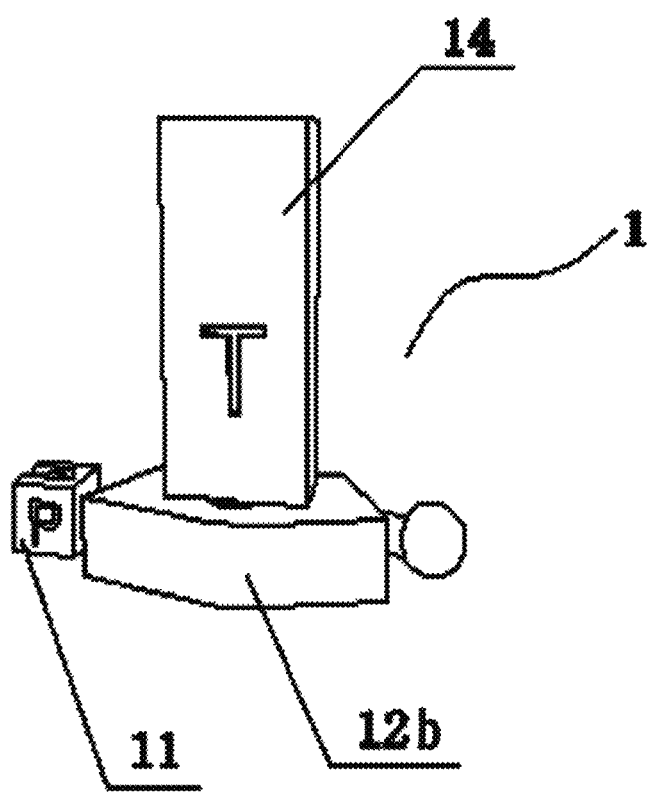
FIG. 5 is a schematic structural view of a nucleotide model in the presence of mutated base.

In the field of genetic science, a spontaneous and heritable mutation could occur in genomic DNA molecules. At the molecular level, gene mutation could-refers refer to a change of a single base pair composition, in this case, a point mutation, or a more macro-level alteration of gene sequence or even gene structures. To accurately represent gene mutation, this teaching aid system in the example further includes a mutant base model 14, while the mutant base model 14 cannot be connected to any disposed base model 13 geometrically and magnetically. As shown in FIG. 5, in the example, the mutant base model 14 is highlighted in a color (e. g., black) different from that of the base model 13, while it has a planar structure at the end, has no complementary structure of connection end 132, and cannot be paired or connected to the opposite base model 13. Therefore, the mutant base model 14 disrupted the accurate processes of the subsequent DNA replication or protein synthesis of which all requires the precise base paring mechanism, a perfect simulation of the damage caused by the mutated base in the entire process of genetic information flow.

Based on the above structures of this invention, the DNA single strand could be assembled with strings of detachable deoxynucleotide models that are connected by special connecting mechanisms described above, and similarly the single (deoxy-) nucleotide model could be assembled with detachable (deoxy-) ribose and base model. The two single DNA strands in opposite direction could be optimally attracted with each other thanks to the complementary base-pairing model made possible by the imbedded magnets to form a double-stranded DNA, twisted carefully a beautiful DNA double helix structure could be formed by the DNA model system. In summary with this model system, the following biological principles or mechanisms could be easily simulated. First of all by assembling of different nucleotide models into different DNA sequences, genetic coding mechanism of all organisms in the form of DNA double-helix could be easily understood and appreciated. Second this model system also represents that the fact that DNA is composed of two engaged double strands that are paired with each other and go in opposite direction in the cell, and DNA double helix could be compressed and condensed into the form of left-handed helix and in opposite direction. And this two single strands could be opened dynamically for replication and transcription. It is enough to display the left-handed structure of the DNA double helix from a plurality of angles for intuitive research and play in learning or entertainment.

The self-replication of DNA is a precise and complex process, involving separating the double-stranded DNA under the action of DNA helicase, binding a DNA polymerase to the two separated single strands, followed by copying the genetic information of the two strands for replication, thereby forming a pair of DNA double strands.

Figure 6:
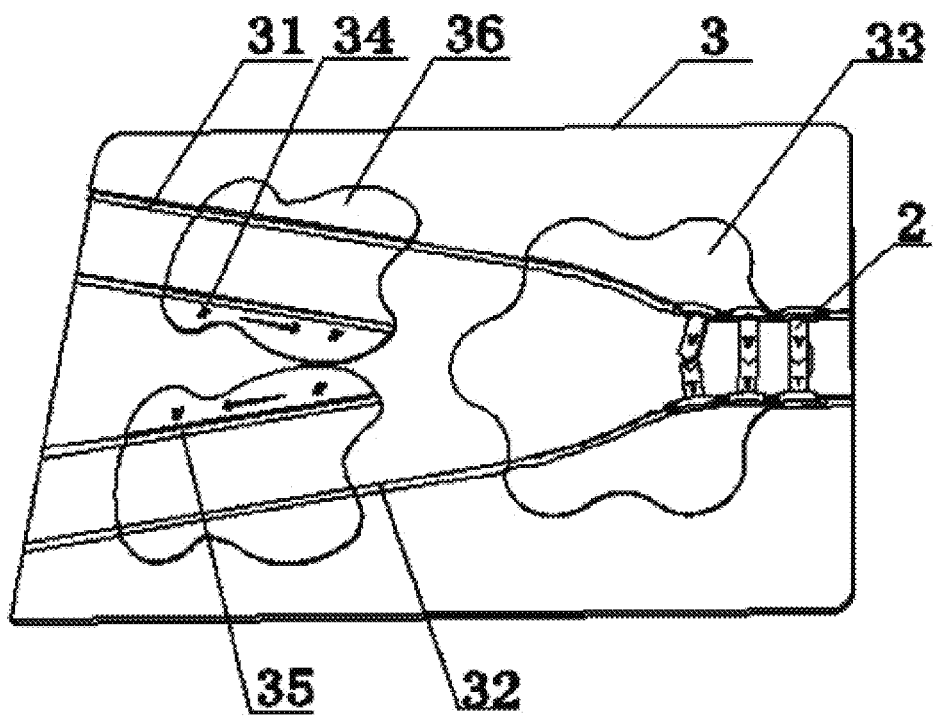
FIG. 6 is a schematic structural view of a DNA replication plate.
Figure 7:
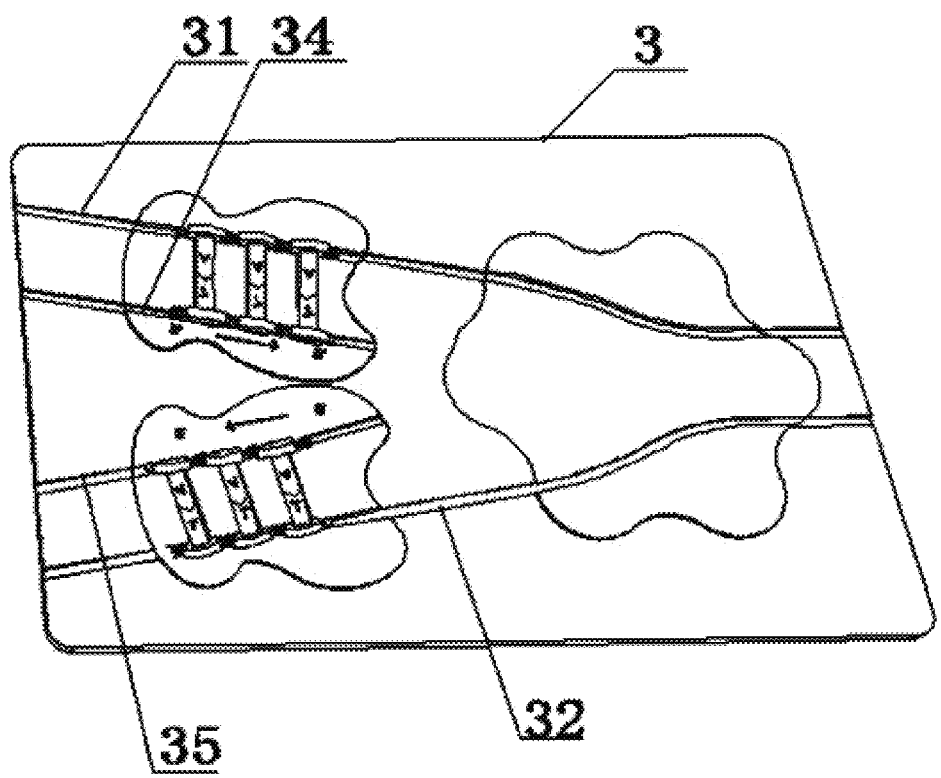
FIG. 7 is a schematic view showing the DNA replication process in a DNA replication plate.

As shown in FIGS. 6 and 7, to display the self-copying and replication process of all genetic information of the long DNA chain, this teaching aid system further includes a DNA replication plate 3.

The DNA replication plate 3 at least includes a first groove 31 and a second groove 32 adapted with the two chain structures of the DNA double helix model, respectively, at least part of the relative distance between the first groove 31 and the second groove 32 varies gradually, and the minimum relative distance between the first groove 31 and the second groove 32 is equal to the relative distance between the two oppositely disposed deoxyribose models 1 in the DNA double helix model; when the relative distance between the first groove 31 and the second groove 32 is greater than the relative distance between the two oppositely disposed deoxyribose models 1, the magnetically attached base models 13 of the two strands are automatically separated to form two DNA single strands.

As a preferable embodiment, the DNA replication plate 3 further includes a DNA helicase model 33 embedded onto the surface thereof and constituting a part of the first groove 31 and the second groove 32. The shape of the DNA helicase model 33 is abstracted from the real helicase protein structure, to animate the process of opening DNA double helix, where the two single strands are formed.

The DNA replication plate 3 further includes a third groove 34 and a fourth groove 35 disposed between the first groove 31 and the second groove 32. Both the third groove 34 and the fourth groove 35 are disposed at the end where the first groove 31 and the second groove 32 is widely open. The first groove 31 and the third groove 34, as well as the second groove 32 and the fourth groove 35 are respectively disposed in parallel, and the relative distance between the two grooves in parallel is equal to the relative distance between the two oppositely disposed deoxyribose models 1.

Several free deoxynucleotide models 1 base-paired with the DNA single strand in the first groove 31 or the second groove 32 are disposed in the third groove 34 or the fourth groove 35, respectively; Based on the principle of specific A-T and G-C base paring mechanism, when the deoxynucleotide model 1 in the third groove 34 can base-pair with the DNA single strand disposed in the first groove 31, and similarly the deoxynucleotide model 1 in the fourth groove 36 can base-pair with the DNA single strand in the second groove 32. By repeating this action followed by head-to-tail connecting the nucleotides in groove 34 and 35 respectively, two nascent DNA double strand models 2 can be produced, hence the replication of the original DNA is completed.

Likewise, the DNA replication plate 3 further includes a DNA polymerase model 36 embedded on the surface thereof and constituting a part of the first groove 31, the second groove 32, the third groove 34 and the fourth groove 35. The shape of the DNA polymerase model 36 is based on the real polymerase protein structure, and symbolically shows that one DNA could be replicated to form two new double-helix structures.

Transcription of a DNA fragment into a correspond RNA fragment is the first key step in gene expression, and it is also an essential step for information stored in DNA to flow out of the nucleus. In general, transcription is a dynamic process in which a DNA fragment is bound by a RNA polymerase, then the doubled stranded DNA is separated to form a "transcription bubble", this so-called transcription bubble slides along the direction of expression while DNA is being transcribed, and the messenger RNA product flows out from one side of the bubble.

Figure 8:
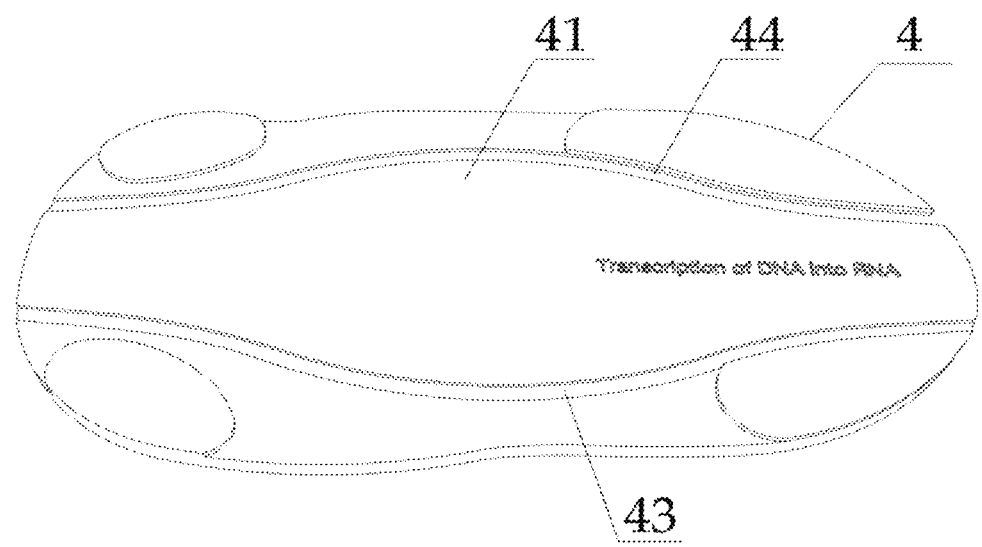
FIG. 8 is a schematic structural view of an RNA transcription plate.
Figure 9:
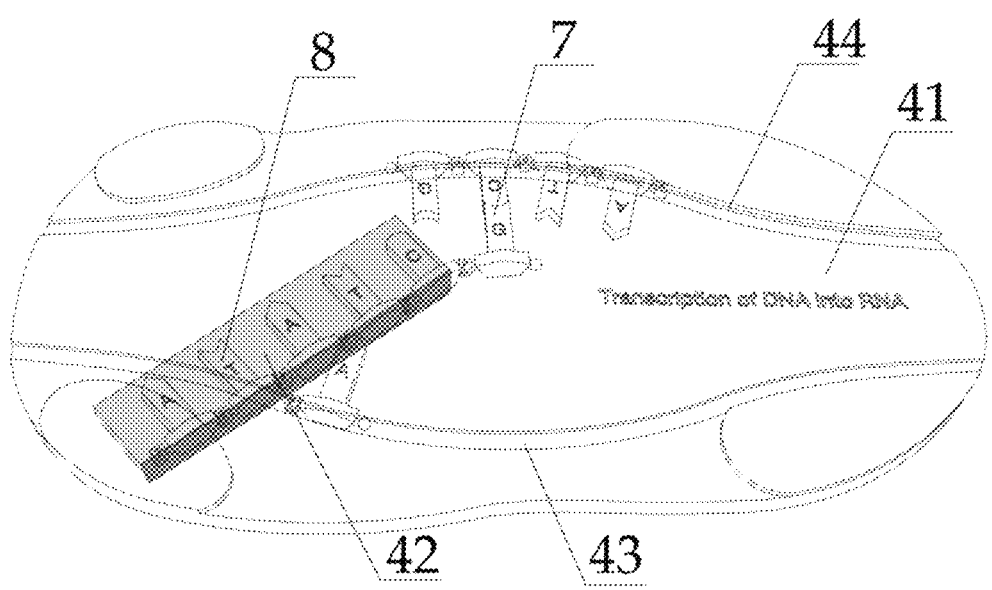
FIG. 9 is a schematic view showing the RNA transcription process in an RNA transcription plate.

As shown in FIGS. 8 and 9, to reflect the transcription processes, i.e., opening of the DNA double helix structure, base-pairing between DNA-RNA, forming messenger RNA, this teaching aid system further includes an RNA transcription plate 4. To display the RNA structure, the base model 13 in the example is also used to represent uracil (U), which certainly assumes a different color from other base models.

The RNA transcription plate 4 includes a planar main plate 41 and an independent duct 42, a fifth groove 43 and a sixth groove 44 that are oppositely disposed on the planar main plate 41 and respectively adapted with the two chain structures of the DNA double strand model 2. The relative distance between the fifth groove 43 and the sixth groove 44 is greater than the relative distance between the two oppositely disposed deoxyribose models 1 so that the adaptively connected base model 13 is separated to form two single strands of DNA. Preferably, the relative distance between the fifth groove 43 and the sixth groove 44 is smaller at both ends and larger in the middle, so as to reflect the process of opening of DNA double helix structure—transcription—closing.

The distance between the fifth groove 43 and the sixth groove 44 reaches the maximum right in the middle of the transcription plate, forming the so-called "transcription bubble". The free ribonucleotide model 7 in the transcription bubble is paired with the DNA single strand in the sixth groove 44, and then the adjacent ribonucleotides are linked to form the intact messenger RNA (mRNA) model 8 and then flows out of the transcription bubble via the duct or tube 42.

The transcribed mRNA will swim out of the nucleus to the cytoplasm to serve as the template for protein synthesis. Transfer RNA (tRNA) is a "transporter", which bridges mRNA with amino acid. Thus a tRNA is an RNA that carries a specific amino acid at one end and a specific mRNA code-reading side at the other end. It functions to recognize the specific three-nucleotide genetic code, called triplet or codon, on the mRNA so that its correspondingly carried amino acid is positioned in place for the correct protein synthesis. During this process, tRNA reads out the genetic information on the mRNA molecule in the form of codon. Thus each codon or mRNA triplet codes for a specific amino acid.

Figure 10:
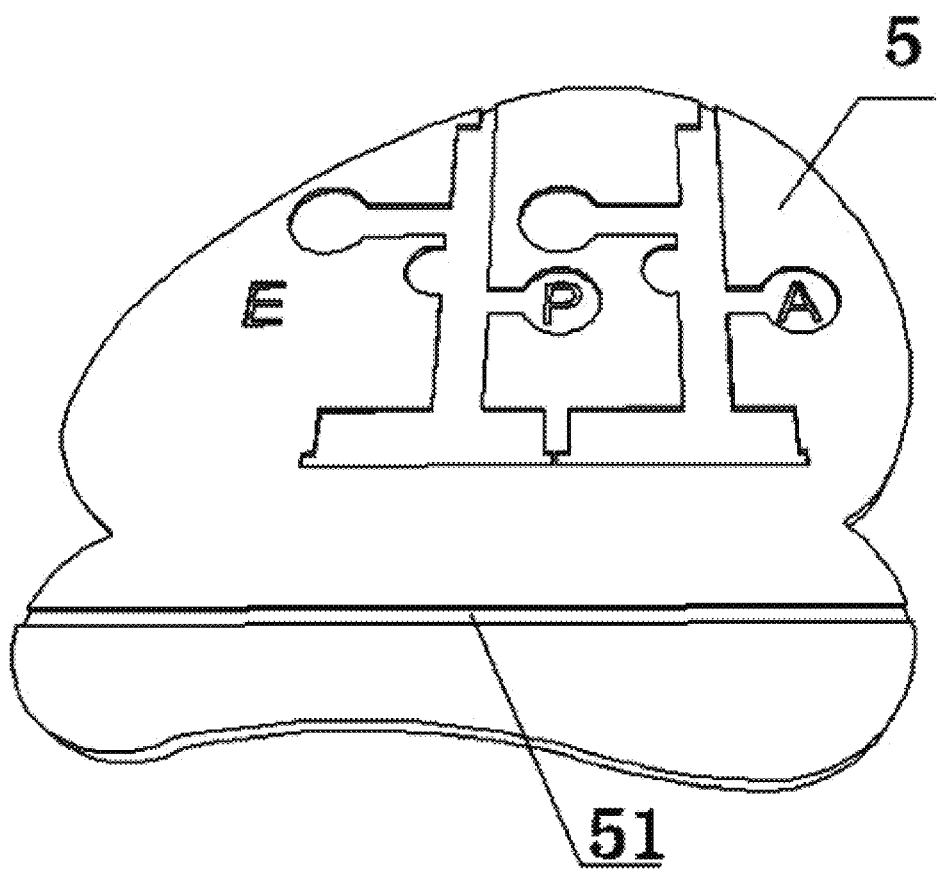
FIG. 10 is a schematic structural view of a translation plate.
Figure 11:
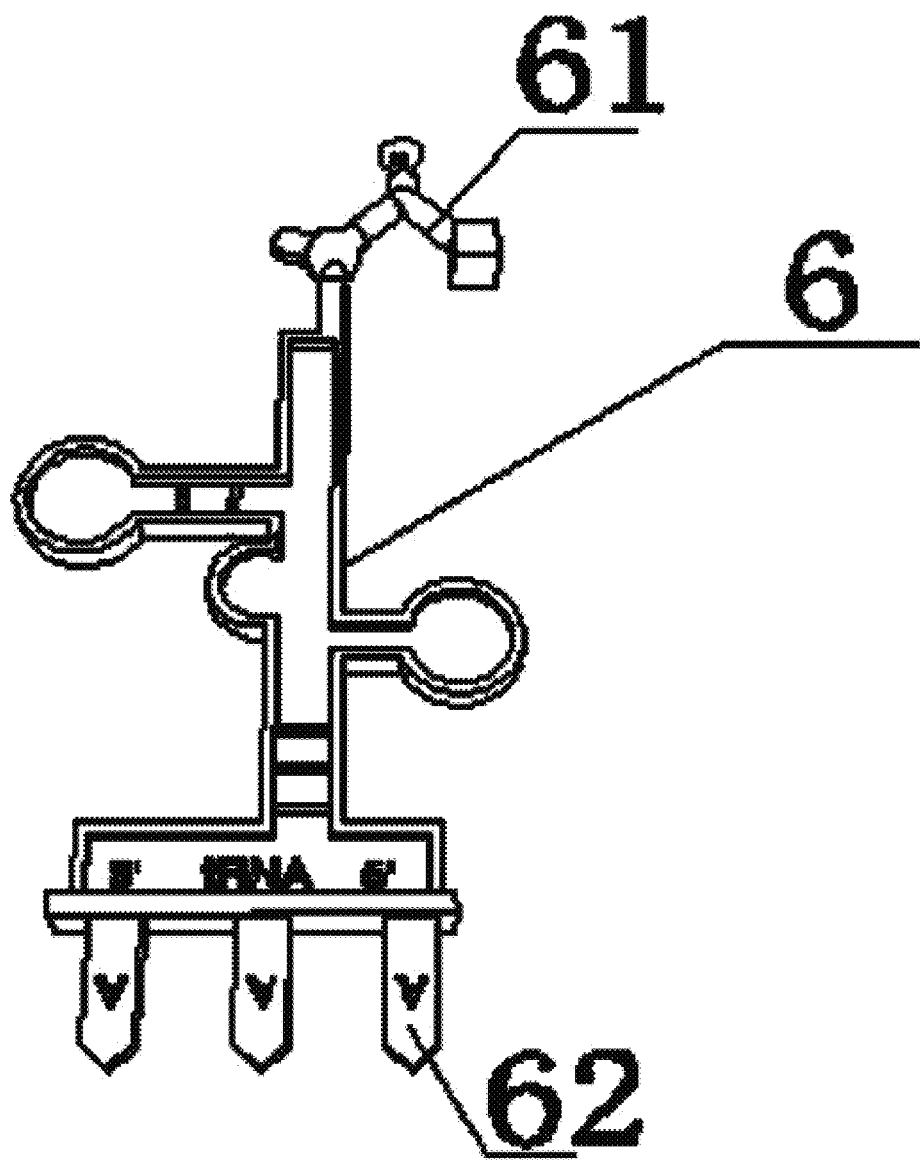
FIG. 11 is a schematic structural view of a transfer RNA model.
Figure 12:
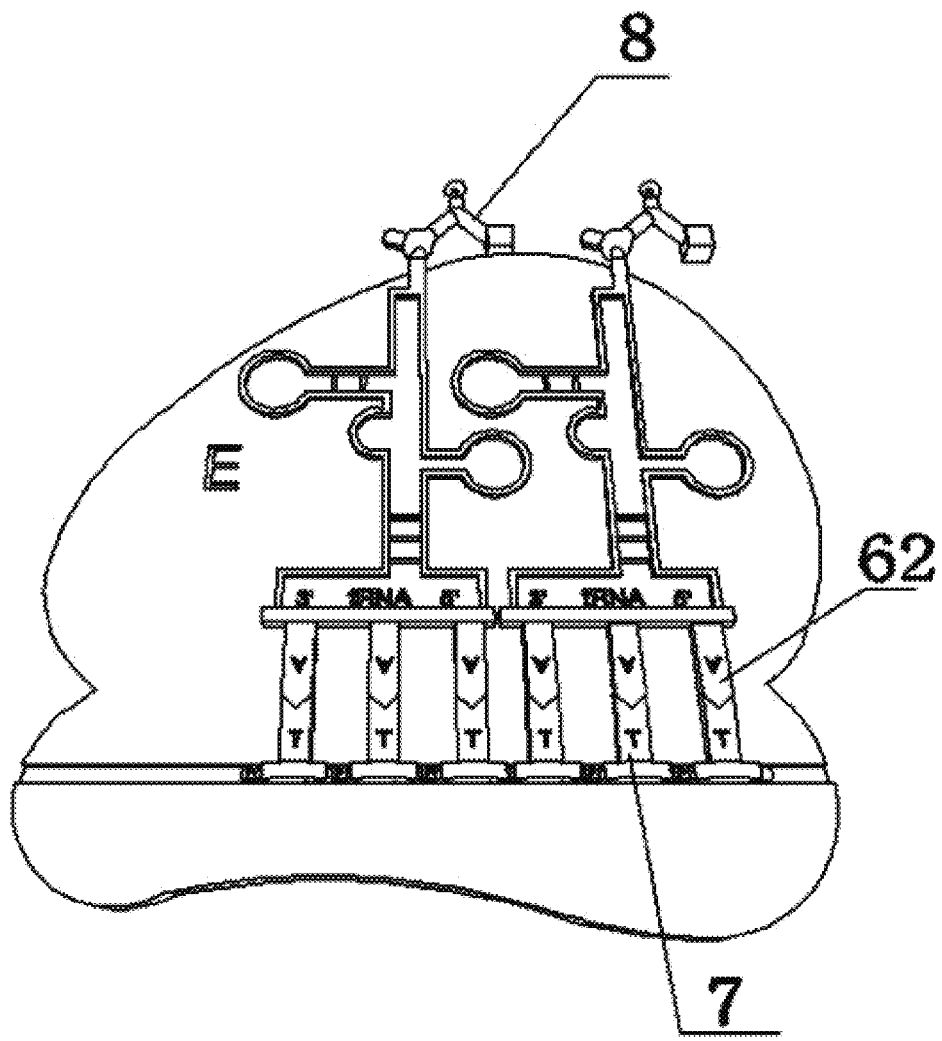
FIG. 12 is a schematic view showing a protein translation process.

To this end, as shown in FIGS. 10, 11 and 12, this teaching aid system further includes a translation plate 5 and a transfer RNA model 6. The translation plate 5 at least includes an eighth groove 51 adapted with the messenger RNA model, and the transfer RNA model 6 includes an amino acid molecular structure 61 disposed at one end and a codon reading structure 62 at the other end. In the transfer RNA model 6, the positioning of amino acid molecules is achieved first by the base pairing between the messenger RNA model 8 and the codon structure 62 with which the corrected amino acid is coded for. Two amino acid models are brought in by two tRNAs and once they are correctly base-paired with their mRNA codons at the corresponding reading ends, a peptide bond is formed between the two amino acid after which one of the tRNAs is ejected out from the translation plate. The newly formed peptide connected with the tRNA and the mRNA moves into the next position, vacant the position of P waiting for the next amino acid. By repeating this process the protein product coded by the entire mRNA molecular model [8] is produced.

Therefore, the codon structure 62 in the example refers to the three specific bases connected to the lower end of the transfer RNA model 6, which are paired with the three base models in the mRNA model 7.

The synthesis of protein is a precise, multi-step process that requires the participation of multiple molecules. A brief description is as follows: First, after the mRNA enters the cytoplasm from the nucleus, it attaches to the ribosome and begins to form an initial mixture. Then, the tRNA carries the corresponding activated amino acid into the large subunit part of the ribosome according to the codon of the mRNA. After the completion of this step, the ribosomal complex reads the next mRNA codon, and the first tRNA shifts to the previous site. At this time, the next tRNA carrying the corresponding amino acid enters the released large subunit part. At this time, a peptide bond can be generated between the two adjacent amino acids to form a dipeptide, and then the first amino acid is released from tRNA. The first tRNA completing the transfer leaves the previous site, and reaches the leaving position. The tRNA carrying the dipeptide moves from the large subunit part to the previous site, waiting for the third tRNA carrying an amino acid to reach the large subunit part, and then a peptide chain is formed. The cycle goes back and forth until the protein synthesis is completed.

To reflect the above process, the translation plate involves at least two transfer RNA models 6, and the two amino acid molecular structures 61 at the each end also have detachable structures to reflect the formation of peptides.

In addition, this teaching aid system further includes a basic gene regulation identifier (not shown) and an epigenetic gene regulation identifier (not shown) for reflecting the mechanism of controlling gene expression in the organism.

Here, the basic gene regulation identifier can be inserted into any deoxyribose sequence model 12. The gene regulation identifier in the example mainly plays a role of identification, has a relatively small structure, and may be a sphere, a cylinder, an ellipsoid or any polyhedron with specific color, which is not limited in the example. The gene regulation identifier is inserted to the outside of the backbone of the deoxyribose double stranded model 12, and fixedly connected by fitting with the insert position, such as, clamping slots, sockets, and the like, disposed on an outer side of the deoxyribose model 12b for intuitively marking the gene promoter in the DNA, the inhibition-expressing position or the assistance-expression position.

The epigenetic gene regulation identifier is connected to any base model 13. The epigenetic regulation identifier has similar structure and function with the basic gene regulation identifier, that is, playing a role of identification likewise. The epigenetic gene regulation identifier is attached to the surface of the base model 13, and is fixedly connected by fitting with the insert position, such as clamping slot, socket, etc., disposed at an outer side of the base model 13, which is used to mark the position of methyl group (—CH3) or acetyl group (—Ac). In the mechanism of epigenetic expression, a methylated or acetylated sequence has different biological meaning, which is used for precise regulation or inheritance of life experience of the previous generation. Therefore, by setting an epigenetic gene regulation identifier to mark the methyl group or acetyl group, this mechanism can be intuitively displayed.

Therefore, the comprehensive teaching aid system for genetic science in the example can not only be used to assemble any DNA sequences and accurately display in the form of DNA double helix structure, but also simulate the processes of DNA replication, mRNA transcription, and protein synthesis by using the corresponding replication, transcription and translation plates together with the transfer RNA models. In other words this is a complete system that can simulate every step of the central dogma of biology in all essential details. This is a comprehensive and unique teaching aid system for genetic science that allows the learning and appreciating of the science easily and simultaneously.

It should be noted that the above described system are only the preferable embodiments of the this invention. It does not intend to limit the present invention. Any modification, equivalent replacement, improvement, etc. made within the spirit and principle of the present invention shall fall within the scope of protection of the present invention.

What is claimed is:

1. A comprehensive teaching aid system for genetic science at least comprising: a two-strand deoxyribonucleic acid (DNA), when twisted forms a double helix model composed of several adjacently and oppositely connected deoxynucleotide models; and a ribonucleic acid (RNA) single-strand model composed of several adjacently connected ribonucleotide models; a nucleotide comprising deoxyribonucleotide or ribonucleotide, in which a ribose can be a deoxyribose or a ribose, respectively depending on whether the ribose is present in a DNA or an RNA molecule; and a nucleotide model comprising a phosphate model, a ribose model and a base model connected in sequence;

wherein, between two adjacently disposed nucleotide models, the ribose model is connected to the phosphate model to form a detachable and flexible chain structure; the base model is laterally connected to the ribose model, and two base models in two oppositely disposed ribose models are complementarily connected via special geometric structure with magnetic attraction; and a DNA double helix structure can be freely rotated along an axial direction;

wherein the comprehensive teaching aid system further comprises a gene expression regulation mechanism plugin identifier (IDexp) and an epigenetics mechanism plugin identifier (IDepi), the IDexp being connected to the ribose models, and the IDepi being connected directly to the base models.

2. The comprehensive teaching aid system of claim 1, wherein, in a single nucleotide model, the ribose model and the phosphate model form an one-piece structure, and a spherical connection body is disposed at one end of the ribose model away from the phosphate end; and a spherical receiving cavity that is axially-opened is disposed in the phosphate model, and the spherical receiving cavity is mated with a spherical connection body in another nucleotide model which is adjacently disposed.

3. The comprehensive teaching aid system of claim 2, wherein the phosphate model further comprises at least one buffer slot disposed on a side thereof.

4. The comprehensive teaching aid system of claim 2, wherein the ribose model further comprises a clamping slot disposed on a side thereof, and the base model comprises a clamping section disposed at an end of the base model and mated with the clamping slot; the above-mentioned spherical connection body, plus the spherical receiving cavity together with the clamming slot ensures the detachable and flexible nature of the connected nucleotide chains in this teaching aid system.

5. The comprehensive teaching aid system of claim 4, wherein the base model represents one of adenine (A), thymine (T), guanine (G), uracil (U) or cytosine (C), the endings of each base model representing different bases are structurally different from each other, and ends of the two base models which could be base-paired are attached to each other geometrically complementary.

6. The comprehensive teaching aid system of claim 5, wherein the base model comprises connection ends with two forms of structures: one of circular arc-shaped convex, and circular arc-shaped concave complementarily connected to the circular arc-shaped convex; one of linear-triangle structure, and inverted-triangle-concave complementarily connected to the linear-triangle structure.

7. The comprehensive teaching aid system of claim 5, wherein the base models representing different bases have different colors.

8. The comprehensive teaching aid system of claim 7, wherein there is a magnetic connection or a mechanical connection between the two base models which are oppositely and complementarily connected or attached.

9. The comprehensive teaching aid system of claim 5, further comprising a mutant base model; the mutant base model is not complementarily connected to any other base models which are oppositely disposed.

10. The comprehensive teaching aid system of claim 1, further comprising: a DNA replication plate at least comprising a first groove and a second groove which are respectively adapted with the two chains of the DNA double helix model, and at least part of a distance between the first groove and the second groove varies gradually, and a minimum distance between the first groove and the second groove is equal to a distance between the two oppositely disposed ribose models in the DNA double helix model; when the distance between the first groove and the second groove is greater than the distance between the two oppositely disposed ribose models, the complementarily connected base models are separated to form two DNA single strands.

11. The comprehensive teaching aid system of claim 10, wherein the DNA replication plate further comprises a third groove and a fourth groove disposed between the first groove and the second groove, the first groove and the third groove, as well as the second groove and the fourth groove being respectively disposed in parallel, a distance between the two grooves parallel to each other being equal to a distance between the two oppositely disposed ribose models, and several free deoxynucleotide models base-paired with a DNA single strand in the first groove or the second groove being disposed in the third groove or the fourth groove, respectively; when a free deoxynucleotide models disposed in the third groove and a DNA single strand disposed in the first groove, as well as free deoxynucleotide models disposed in the fourth groove and a DNA single strand disposed in the second groove are complementarily base-paired and then each thus paired free nucleotide is laterally head-to-tail jointed, respectively, to form two new DNA double helix models, the replication of the original DNA is completed.

12. The comprehensive teaching aid system of claim 1, further comprising: an RNA transcription plate comprising a planar main plate, a fifth groove and a sixth groove oppositely disposed on the planar main plate and respectively adapted with two chain structures of the DNA double helix model, and an independent duct, a distance between the fifth groove and the sixth groove being greater than a distance between two oppositely disposed ribose models so that a first base model and a second base model are separated to form two DNA single strands, facilitating a base pairing between a free ribonucleotide model and a DNA single strand in the sixth groove, when multiple thus-paired ribonucleotide models jointing head-to-tail, a messenger RNA model is formed.

13. The comprehensive teaching aid system of claim 11, further comprising: a translation plate in the shape of ribosome with "E" and "P" labeled positions, and a transfer RNA model, the translation plate at least comprising an eighth groove adapted with the messenger RNA model, the transfer RNA model comprising an amino acid molecular adapting structure (AAAC) disposed at one end thereof and a codon base paring structure (CBPC) disposed at the other end thereof, and the transfer RNA model being subject to base pairing with the messenger RNA model through the CBPC to complete the transferring of the codon-encoded amino acid molecules in place and the subsequent connection by peptide bond between two adjacent amino acid molecules to form a protein molecular model.

14. The comprehensive teaching aid system of claim 6, wherein the base models representing different bases have different colors.

15. The comprehensive teaching aid system of claim 6, further comprising a mutant base model; the mutant base model is not complementarily connected to any base model which are oppositely disposed.

16. The comprehensive teaching aid system of claim 8, further comprising a mutant base model; the mutant base model is not complementarily connected to the any base model which are oppositely disposed.

17. The comprehensive teaching aid system of claim 2, further comprising: a DNA replication plate at least comprising a first groove and a second groove which are respectively adapted with two chain structures of the DNA double helix model, and at least part of a distance between the first groove and the second groove varies gradually, and a minimum distance between the first groove and the second groove is equal to a distance between the two oppositely disposed ribose models in the DNA double helix model; when the distance between the first groove and the second groove is greater than the distance between two oppositely disposed ribose models, the complementarily connected base models are separated to form two DNA single strands.

18. The comprehensive teaching aid system of claim 3, further comprising: a DNA replication plate at least comprising a first groove and a second groove which are respectively adapted with two chain structures of the DNA double helix model, and at least part of a distance between the first groove and the second groove varies gradually, and a minimum distance between the first groove and the second groove is equal to a distance between two oppositely disposed ribose models in the DNA double helix model; when the distance between the first groove and the second groove is greater than the distance between the two oppositely disposed ribose models, the complementarily connected base models are separated to form two DNA single strands.

19. A comprehensive teaching aid system for genetic science at least comprising: a two-strand deoxyribonucleic acid (DNA), when twisted forms a double helix model composed of several adjacently and oppositely connected deoxynucleotide models; and a ribonucleic acid (RNA) single-strand model composed of several adjacently connected ribonucleotide models; a nucleotide comprising deoxyribonucleotide or ribonucleotide, in which a ribose can be a deoxyribose or a ribose, respectively depending on whether the ribose is present in a DNA or an RNA molecule; and a nucleotide model comprising a phosphate model, a ribose model and a base model connected in sequence;
  wherein, between two adjacently disposed nucleotide models, the ribose model is connected to the phosphate model to form a detachable and flexible chain structure; the base model is laterally connected to the ribose model, and two base models in two oppositely disposed ribose models are complementarily connected via special geometric structure with magnetic attraction; and a DNA double helix structure can be freely rotated along an axial direction;
  wherein, in a single nucleotide model, the ribose model and the phosphate model form an one-piece structure, and a spherical connection body is disposed at one end of the ribose model away from the phosphate end; and a spherical receiving cavity that is axially-opened is disposed in the phosphate model, and the spherical receiving cavity is mated with a spherical connection body in another nucleotide model which is adjacently disposed; the phosphate model further comprises at least one buffer slot disposed on a side thereof.

20. A comprehensive teaching aid system for genetic science at least comprising: a two-strand deoxyribonucleic acid (DNA), when twisted forms a double helix model composed of several adjacently and oppositely connected deoxynucleotide models; and a ribonucleic acid (RNA) single-strand model composed of several adjacently connected ribonucleotide models; a nucleotide comprising deoxyribonucleotide or ribonucleotide, in which a ribose can be a deoxyribose or a ribose, respectively depending on whether the ribose is present in a DNA or an RNA molecule; and a nucleotide model comprising a phosphate model, a ribose model and a base model connected in sequence;
  wherein, between two adjacently disposed nucleotide models, the ribose model is connected to the phosphate model to form a detachable and flexible chain structure; the base model is laterally connected to the ribose model, and two base models in two oppositely disposed ribose models are complementarily connected via special geometric structure with magnetic attraction; and a DNA double helix structure can be freely rotated along an axial direction;

the comprehensive teaching aid system further comprises: a DNA replication plate at least comprising a first groove and a second groove which are respectively adapted with the two chains of the DNA double helix model, and at least part of a distance between the first groove and the second groove varies gradually, and a minimum distance between the first groove and the second groove is equal to a distance between two oppositely disposed ribose models in the DNA double helix model; when the distance between the first groove and the second groove is greater than the distance between the two oppositely disposed ribose models, the complementarily connected base models are separated to form two DNA single strands;

wherein the DNA replication plate further comprises a third groove and a fourth groove disposed between the first groove and the second groove, the first groove and the third groove, as well as the second groove and the fourth groove being respectively disposed in parallel, a distance between the two grooves parallel to each other being equal to a distance between the two oppositely disposed ribose models, and several free deoxynucleotide models base-paired with a DNA single strand in the first groove or the second groove being disposed in the third groove or the fourth groove, respectively; when a free deoxynucleotide models disposed in the third groove and a DNA single strand disposed in the first groove, as well as free deoxynucleotide models disposed in the fourth groove and a DNA single strand disposed in the second groove are complementarily base-paired and then each thus paired free nucleotide is laterally head-to-tail jointed, respectively, to form two new DNA double helix models, the replication of the original DNA is completed.

* * * * *